United States Patent [19]
Wolf et al.

[11] Patent Number: 5,526,453
[45] Date of Patent: Jun. 11, 1996

[54] INTEGRATED OPTICAL COUPLER

[75] Inventors: Barbara Wolf, Kronau; Norbert Fabricius, Hockenheim; Michael Dehm, Walzbachtal; Wolfgang Foss, Aalen, all of Germany

[73] Assignee: IOT Integrierte Optik GmbH, Jena, Germany

[21] Appl. No.: 306,949

[22] Filed: Sep. 16, 1994

[30]  Foreign Application Priority Data

Sep. 17, 1993 [DE] Germany .......................... 43 31 611.5
Aug. 3, 1994 [EP] European Pat. Off. .............. 94710005

[51] Int. Cl.$^6$ ..................................................... G02B 6/26
[52] U.S. Cl. ................................................................ 385/42
[58] Field of Search .................................. 385/42, 37, 45, 385/39, 16

[56]   References Cited

U.S. PATENT DOCUMENTS

| | | | |
|---|---|---|---|
| 4,070,092 | 1/1978 | Burns | 385/45 |
| 4,087,159 | 5/1978 | Ulrich | 385/39 |
| 4,850,666 | 7/1989 | Izutsu et al. | 385/16 |
| 4,961,619 | 10/1990 | Hernandez-Gil et al. | 385/16 |
| 5,004,447 | 4/1991 | Soref | 385/42 |
| 5,048,909 | 9/1991 | Henry et al. | 385/45 |
| 5,082,341 | 1/1992 | Walker | 385/42 |
| 5,093,876 | 3/1992 | Henry et al. | 385/28 |
| 5,119,453 | 6/1992 | Gonthier et al. | 385/42 |
| 5,175,778 | 12/1992 | Nourshargh et al. | 385/42 |
| 5,309,534 | 9/1994 | Cohen et al. | 385/42 |

FOREIGN PATENT DOCUMENTS 0482461  4/1992  European Pat. Off. .

OTHER PUBLICATIONS

"Wavelength Characteristics of (2×2) Optical Channel–Type Directional Couplers with Symmetric or Nonsymmetric Coupling Structures" by A. Takagi et al., Journal of Lightwave Technology, vol. 10, No. 6, Jun. 1992, pp. 735 to 746.

"Adiabatic invariance in GRIN channel waveguides and its use in 3–dB cross couplers" by C. Hussel et al, Applied Optics, vol. 29, No. 28, Oct. 1, 1990 pp. 4105 to 4110.

"Wavelength–Selective Assymmetric Integrated Optical Couplers with Variable Spacing between the Waveguides" by Shun–Ping Chen, Frequenz, vol. 45, No. 9–10, (1991), pp. 225 to 232.

"Adiabatic 3–dB Couplers, Filters, and Multiplexers Made with Silica Waveguides on Silicon", R. Adar et al., Journal of Lightwave Technology, vol. 10, No. 1, Jan. 1992, pp. 46 to 50.

"Channel waveguide Mach–Zehnder interferometer for wavelength splitting and and combining" by A. Tervonen et al, Proceeding SPIE 1513,(1991), pp. 71 to 75.

Primary Examiner—Akm E. Ullah
Attorney, Agent, or Firm—Walter Ottesen

[57]   ABSTRACT

The invention is directed to an integrated (2×2) optical coupler including input waveguides (21, 22) approaching each other at an angle Φ and having different propagation constants and widths ($w_1$, $w_2$), minimum web widths S (approximately 4 μm) and output waveguides (23, 24) of the same width $w_0$. The output waveguides include circular arc segments which connect to the respective input waveguides with abrupt steps. Both directions are the same. Attenuation is avoided where the waveguides come close to each other in the interaction region and arcuate segments in the narrow waveguide 21 are avoided. The optical coupler according to the invention can be used in branching devices and especially in a 2×N branching device and in Mach-Zehnder duplexers.

14 Claims, 5 Drawing Sheets

FIG. 2a
$\lambda = 1.31 \ \mu m, \ \varphi = 0.1°$
FIG. 2b
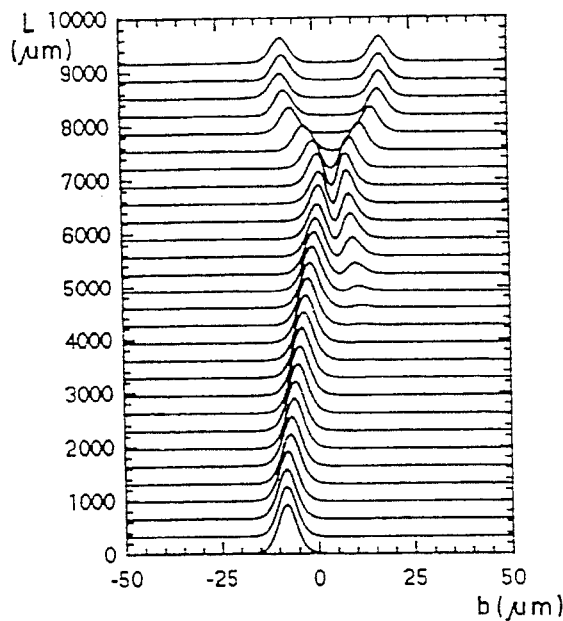
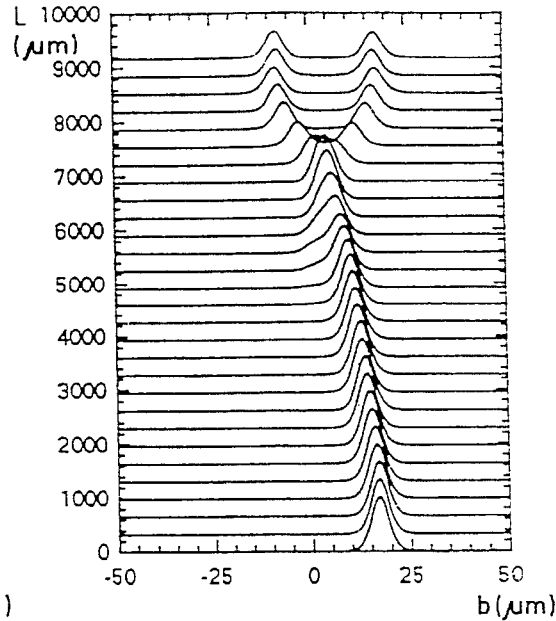
FIG. 2c
$\lambda = 1.55 \ \mu m, \ \varphi = 0.1°$
FIG. 2d
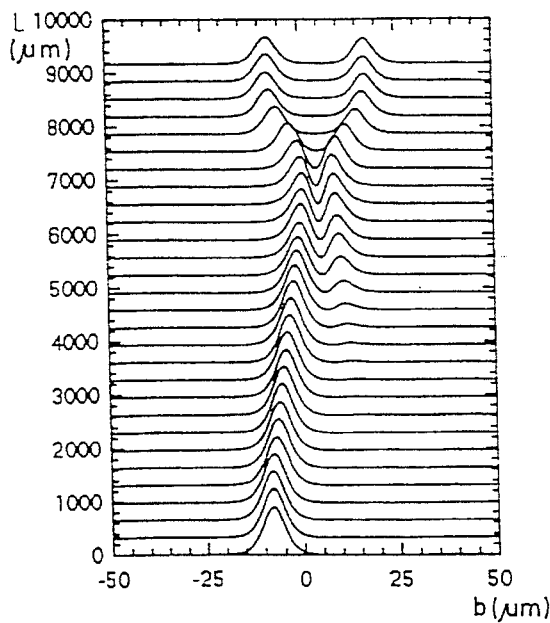
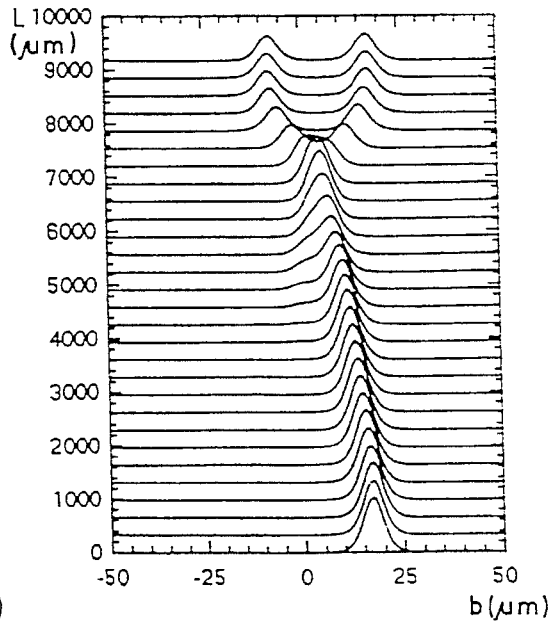

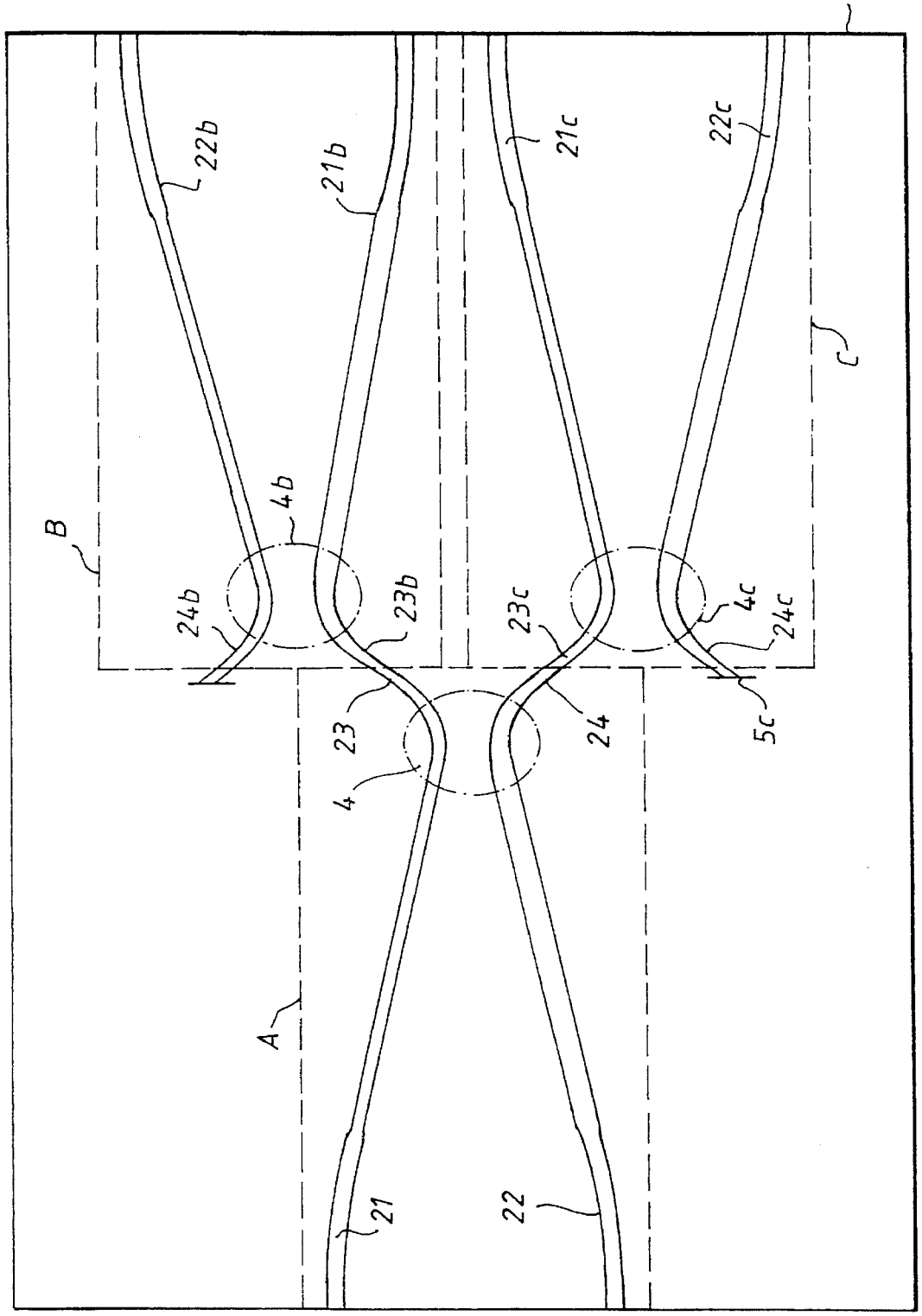

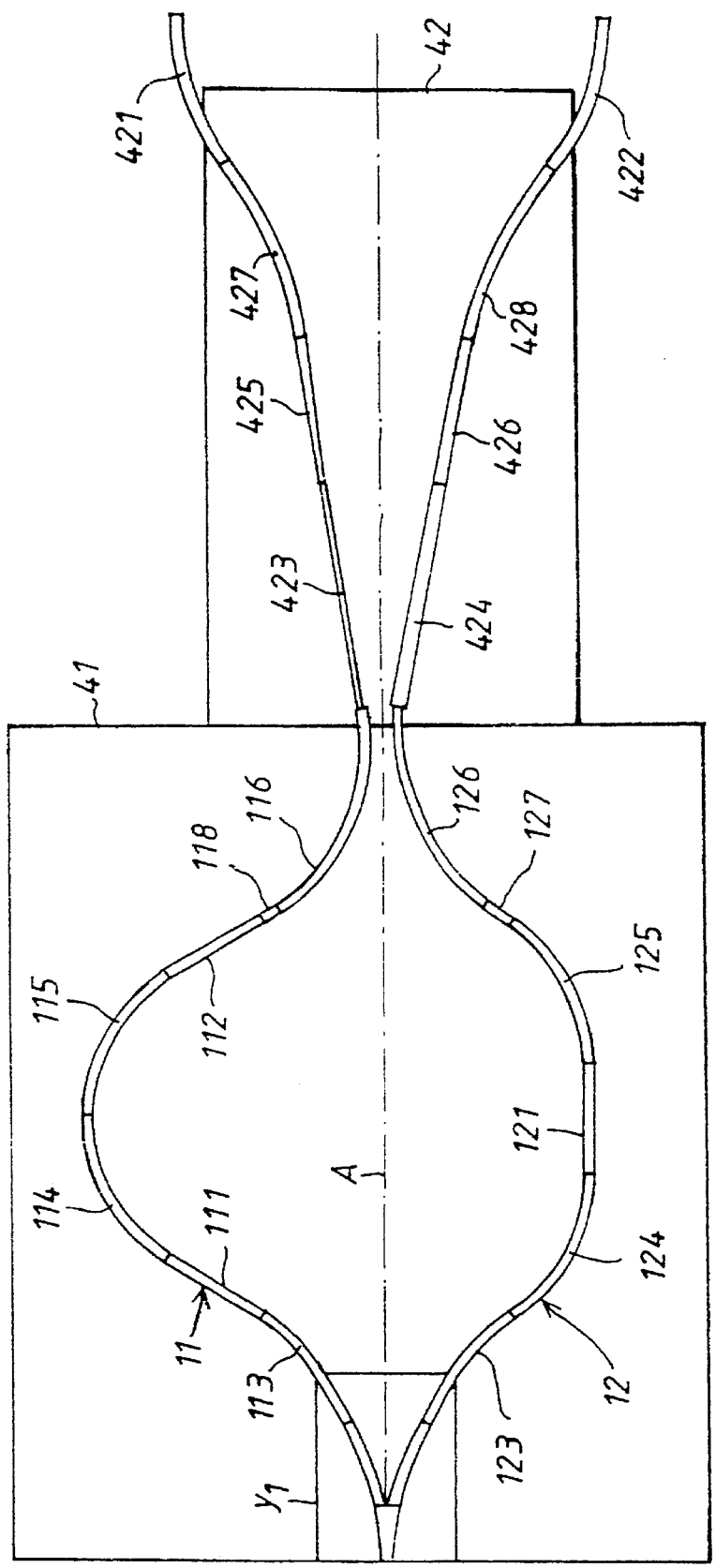

1

INTEGRATED OPTICAL COUPLER

FIELD OF THE INVENTION

The invention relates to an integrated (2×2) optical coupler having two input waveguides which approach each other in an adiabatic manner. The input waveguides have different propagation constants and the optical coupler also includes two output waveguides having the same propagation constants with respect to each other.

BACKGROUND OF THE INVENTION

Such optical couplers are disclosed in the article of C. P. Hussel et al entitled "Adiabatic invariance in GRIN channel waveguides and its use in 3-dB cross couplers" published in Applied Optics, Volume 29, Number 28, (1990), pages 4105 to 4110 (FIG. 5). The function of the input and output waveguides can be transposed as described in U.S. Pat. No. 4,850,666. This patent discloses that such a branching device can be driven in both directions. The propagation constant is in each case determined by the width of the waveguides. All waveguides are joined together in a crossover region. The redirection of the waveguides to a parallel path is shown only schematically. Measures for the transition to unitary waveguide dimensions at the connections of the integrated-optical component are not described.

Tervonen et al discloses a Mach-Zehnder interferometer in the article entitled "Channel waveguide Mach-Zehnder interferometer wavelength splitting and combining" published in the Proceedings SPIE 1513, (1991), pages 71 to 75 (FIG. 1). For an arrangement corresponding to the above-mentioned U.S. Pat. No. 4,850,666, Tervonen et al disclose in this article that the two waveguides having the same widths are guided in S-shape arcuate segments to the coupling location.

The typical crossover angles are very acute and are typically less than 0.2°. The tips of the material surrounding the waveguides and which occur in the crossover region cannot be ideally produced. A blunt end portion of the tip having a width of at least 0.5 µm cannot be avoided in waveguides buried in glass and produced utilizing photolithography and ion exchange. Relatively high losses are produced in this way.

In the arrangement disclosed in U.S. Pat. No. 4,961,619, a blunt tip is, however, expressly introduced for a symmetrical 2×2 optical coupler having a relatively large crossover angle of from 5° to 10°. Because of this blunt tip and in combination therewith, all waveguides having the same width taper in the crossover region whereby overall losses are reduced.

An asymmetrical 2×2 coupler without crossover and without contact is disclosed in the article of Takagi et al entitled "Wavelength Characteristics of (2×2) Optical Channel-Type Directional Couplers with Symmetric or Nonsymmetric Coupling Structures" published in the Journal of Lightwave Technology, Volume 10, Number 6, (June 1992), pages 735 to 746 (FIG. 7).

In this publication, an arrangement is disclosed wherein waveguides having the same width are brought together from circular arcuate segments via S-curved segments into an interaction region where the waveguides are almost parallel. One waveguide tapers here and is, after an S-curve segment, brought with a taper again to the normal width. The curve in the narrow waveguide leads to increased attenuation and reduces the spectral bandwidth.

A variation described as uniformly asymmetric by Takagi et al is also disclosed in the article of Chen entitled "Wavelength-Selective Asymmetric Integrated Optical Couplers with Variable Spacing between the Waveguides" published in "Frequenz", Volume 45, (1991), pages 225 to 232. Two waveguides are brought into S-curve segments at a minimal mutual spacing and, after a short parallel segment, are again separated by S-curve segments. Chen discloses kinks in lieu of curves. The two waveguides each have the same width over its entire length but these widths are different with respect to each other. The two waveguides can also have refractive indices which are the same along the entire length thereof but different with respect to each other.

SUMMARY OF THE INVENTION

It is an object of the invention to provide a 2×2 optical coupler having a geometry which reduces light losses. It is also an object of the invention to provide such an optical coupler which can be produced in glass utilizing photolithography and ion exchange.

The integrated (2×2) optical coupler of the invention includes: a carrier; first and second input waveguides having different propagation constants and being mounted in the carrier; the first and second input waveguides having respective straight, kink-free segments which approach each other adiabatically; an interaction region for receiving the straight, kink-free segments; first and second output waveguides having like propagation constants and extending from corresponding ones of the segments in the region without the input waveguides coming into contact with each other; and, the first and second output waveguides having arcuate segments arranged in the carrier so as to separate the output waveguides from each other with increasing distance away from the interaction region.

Such a structure of the optical coupler can be reliably manufactured especially when utilizing photolithographic masks and ion exchange. This manufacture of the coupler is without disturbing deficiencies as to form or uncertainties with respect to form and thereby does not generate specific light losses. The adiabatic cross coupling is made possible by the very small angle $2\phi$ between the input lightwave conductors. For such small angles, a relatively short structural length is ensured by the output waveguides which immediately diverge away from each other along circularly-shaped paths. The direction of the light propagation is then arbitrary and input and output can be transposed. Preferably, the propagation constants of the waveguides are determined by different widths, that is, only by the structural width of the photomask in the production process. The spacing of the centers of the waveguides is then greater than the mean value of the widths of the next adjacent waveguides and is especially greater by more than 0.5 µm. In this way, the waveguides are reliably contactless and without crossover. Free thin tips of the photomasks, which are difficult to manufacture, are avoided and the web width between the waveguides is controllable.

It was surprisingly determined that the input and output waveguides can abut centered and obtusely to each other. Accordingly, during manufacture with photolithography and ion exchange in a glass substrate, the abrupt transitions can be configured in a stepwise manner as permitted by the resolution capacity of the manufacturing process. Tapers which provide a continuous cross section converter are unnecessary in the region in which the lightwave fields of the two mutually adjacent waveguides superpose and the coupling takes place. In this way, simple masks and a short structural configuration are possible.

The angle between the input waveguides is so small that adiabatic cross coupling of the light waves occurs while taking into account the difference of the two propagation constants; that is, the angle is less than 1° and is preferably less than 0.2°. Precise values are determined with known approximation and simulation methods such as presented in the above-cited publications for the parameters of the specific coupler (for example, the bandwidth, material or the like).

The coupler of the invention is easily suitable for the optical bandwidth normally required in communications technology. This bandwidth is greater than 200 nm and can, for example, be in the range of 1.3 µm to 1.55 µm.

The optical coupler according to the invention is also especially suitable for forming a composite coupler. These composite couplers have upstream or downstream connected couplers or branching devices and are also suitable as branching devices having an input which is left open. Any desired coupler architecture or branching device architecture can be carried out with a unitary structure.

The optical coupler according to the invention is especially suitable as an input element of a 2×N coupler and especially for a 2×8 coupler.

According to another feature of the invention, the coupler according to the invention can define the output coupler of an asymmetric Mach-Zehnder duplexer.

BRIEF DESCRIPTION OF THE DRAWINGS

The invention will now be described with reference to the drawings wherein:

FIGS. 2a to 2d show respective diagrams of a simulation computation which defines the trace of light intensity over the length and width of the embodiment of FIG. 1;

FIG. 3 is a schematic representation of a multiple coupler in which a 2×2 coupler is combined with additional 2×2 couplers utilized as branching devices;

FIG. 4 is a schematic representation of a Mach-Zehnder demultiplexer equipped with an asymmetric 2×2 coupler according to the invention; and, FIG. 5 is a 2×8 coupler equipped with a 2×2 coupler of the invention at the input thereof.

DESCRIPTION OF THE PREFERRED EMBODIMENTS OF THE INVENTION

Figure 1:
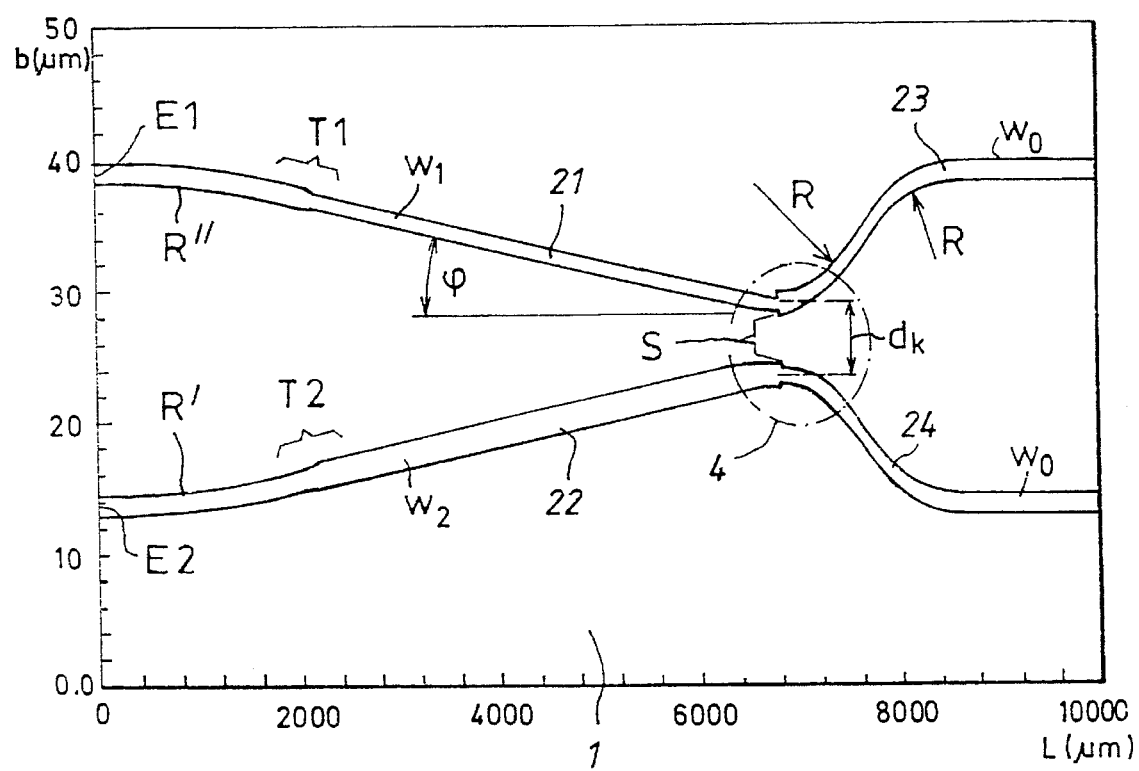
FIG. 1 is a schematic representation of an advantageous embodiment of a 2×2 optical coupler according to the invention.

The embodiment of FIG. 1 is a plan view of a section of a glass substrate 1 having a width b=50 µm and a length L=10,000 µm. The embodiment of FIG. 1 is shown with a width scale increased by a factor of approximately 120. Waveguides (21, 22, 23, 24) are generated in the glass substrate 1 by photolithographic means and ion exchange. These waveguides include input waveguides (21, 22) and output waveguides (23, 24).

In-coupling locations (E1, E2) are provided at the edge of the section of the glass substrate 1. The input waveguides (21, 22) start at the respective in-coupling locations (E1, E2) with a width of 1.5 µm and first extend in parallel segments and then include circular arc segments having respective radii R', R" and thereafter include respective tapers (T1, T2).

The taper T1 of the first waveguide provides a transition to a narrow input waveguide 21 having a reduced width of $w_1=1.1$ µm and the taper T2 of the second waveguide provides a transition to a wide input waveguide segment 22 having an increased width $w_2=1.9$ µm. Thereafter, the two input waveguide segments (21, 22) extend at a half opening angle $\Phi=0.1°$ toward each other. The angle $\Phi$ must be selected to be so small that the cross coupling is adiabatic and without radiating to the ambient and without interaction of the two local modes. This cross coupling occurs when the two input waveguides (21, 22) approach each other in the interaction region 4.

Even larger spacings of the in-coupling locations (E1, E2) are possible by extending the portions of the input waveguides (21, 22) which run toward each other at the angle $\Phi$. Spacings of several millimeters can be realized in a compact manner by arcuate segments having an S-shape between the in-coupling locations (E1, E2) and the tapers (T1, T2). These spacings are necessary for reasons of easier assembly and manipulation.

Tapers (T1, T2) and the circular-arc segments having radii (R', R") can be omitted especially in cascade-like combined arrangements of several 2×2 couplers. In this way, the arrangement can be shortened and losses can be made lower.

The two input waveguides (21, 22) mutually approach to a coupling spacing $d_k$ of 5 µm (measured center to center of the waveguides) in the interaction region 4 and therefore to a web width S of approximately 4 µm. The coupling spacing can be varied by approximately ±1 µm. This web width can be reliably realized in the manufacturing process. The input waveguides (21, 22) extend with an abrupt step into the output waveguides (23, 24) at the point where they are closest to each other. The output waveguides (23, 24) have a unitary width $w_0$ of 1.5 µm.

All waveguides (21, 22, 23, 24) are produced simultaneously in one process. For this reason, the width ($w_0$, $w_1$, $w_2$) is by far the dominating factor which determines the propagation constants in the waveguides (21, 22, 23, 24). The transition from waveguide 21 to waveguide 23 takes place on center and with a deliberate abrupt step which is limited in its steepness by the resolution of the lithographic and ion exchange processes. The transition from waveguide 22 to the waveguide 24 takes place in the same manner.

The transition, however, is free of kinks and the required directional change for leading the output waveguides (23, 24) away from each other is obtained by circular arc segments extending directly from the step. These circular arc segments have a radius R and this change in direction is achieved with low loss and a favorable structural length. The radius R is greater than approximately 80 mm, for example, 90 mm to reduce losses.

Counter arcuate segments having preferably a radius R of the same magnitude are provided in order to obtain parallel traces of the output waveguides (23, 24) at the edge of the substrate 1. This is, as a rule, needed for coupling additional optical elements. Intermediate straight segments can be provided. The spacing of the output waveguides (23, 24) can be adjusted at the edge by selecting the radii, the lengths of the arcuate segments, et cetera up to several millimeters as required.

Arcuate segments in waveguides generally have a greater attenuation and a narrower spectral bandwidth when compared to straight segments. This attenuation is increased and the bandwidth more narrowed by decreasing width. In the arrangement according to the invention, arcuate segments only occur over lengths having the width $w_0$ and having the same radii in each of the two input waveguides (21, 22) and the two output waveguides (23, 24). Accordingly, in the invention, a slight attenuation, which is uniform for all light paths, and a likewise uniform spectral bandwidth of the 2×2 light coupler is obtained.

For the embodiment of FIG. 1, FIGS. 2a to 2d show the traces of the adiabatic cross coupling with the uniform distribution of the input intensity to the two outputs. In FIG. 2a, this is shown for a light wavelength λ=1.31 μm for in-coupling into the input waveguide 21 (narrow) and in FIG. 2b for the in-coupling into the input waveguide 22 (wide). The same is shown in FIGS. 2c and 2d for a second wavelength λ=1.55 μm which is generally used in optical communications technology.

When in-coupling into the narrow input waveguide 21 (FIGS. 2a and 2c), the image in the interaction region 4 is very different compared to the in-coupling in the wide input waveguide 22 (FIGS. 2b and 2d). At the output, where the output waveguides (23, 24) are separate, a very uniform distribution of the intensity is shown on the two output waveguides (23, 24).

FIG. 3 provides an example for utilizing the 2×2 coupler according to the invention. Three 2×2 couplers (A, B, C) are arranged on a substrate 11 and define a 2×4 coupler. The output waveguide 23c of the coupler C, which is used only as a branching device, extends from the output waveguide 24 of the coupler A. The second output waveguide 24c of the coupler C is therefore provided with a suitable terminal 5c. In-coupling can also be provided at the output waveguide 23c. Interaction region 4c and input waveguides (21c, 22c) are configured as shown in FIG. 1. The coupler B is the mirror image of coupler C and extends from the output waveguide 23.

The output waveguides of couplers A, B and C are connected to each other directly after each first circular arc segment in order to obtain compact dimensions and low attenuation. In this way, only a simple S-shaped segment lies between two interaction zones (4, 4c).

Alternatively, two 2×2 couplers in cascade can extend one into the other with input waveguides having no tapers and arcuate segments and with each input waveguide having the same width.

No limits are set on the combination of the 2×2 couplers of the invention, even in a unitary substrate of the integrated optical components.

The values provided in the table for the uniformity of the distribution to the two outputs and for the attenuation (excess loss) are measured on four samples of the 2×2 couplers of FIG. 1 with the above-mentioned data. The attenuation is given in terms of excess loss, that is, the loss exceeding the loss (3 dB) in one waveguide inherently associated with the distribution to two waveguides. This is for both light flow directions from an input waveguide (21 or 22) to an output waveguide (23 or 24) and vice versa.

TABLE

| Wavelength | [μm] | 1.31 | 1.55 | 1.2–1.6 |
|---|---|---|---|---|
| Uniformity | [dB] | 0.09 ± 0.06 | 0.22 ± 0.11 | max. 0.65 |
| Additional Loss | [dB] | 0.67 ± 0.12 | 0.82 ± 0.13 | max. 1.3 |

From the above, it can be seen that excellent quality is obtained at the wavelengths 1.3 μm and 1.55 μm. These wavelengths are important in the area of optical communications technology.

FIG. 4 shows a Mach-Zehnder duplexer as it is disclosed in principle, for example, in European patent publication 0,482,461. The Mach-Zehnder duplexer is equipped with a Mach-Zehnder interferometer 41 having: two light paths (11, 12) having different geometric path lengths, a Y-branching device $Y_1$ at the input of the Mach-Zehnder interferometer 41 and an asymmetric 2×2 coupler 42 at the output thereof. In the operation as a demultiplexer, the light entering from the left is coupled into one of the two output channels (421, 422) in dependence upon its wavelength. In the opposite direction, the arrangement is a multiplexer.

According to another feature, an arcuate segment (123, 124, 125, 126) mirrored to axis A corresponds to each arcuate segment (113, 114, 115, 116) of the first arm 11. The difference of the geometric as well as optic wavelength of each arm (11, 12) therefore results only from the different overall lengths of the straight segments (111, 112, 118) in the arm 11 and straight segments (121, 127) in the arm 12.

The abrupt transition of the waveguide width in the coupling region is a feature of the invention and takes place directly at the end of the last arcuate segments (116, 126) of the Mach-Zehnder interferometer 41. The wide waveguide 424 and the narrow waveguide 423 are connected via tapers (426, 425) to the respective arcuate segments (428, 422) and (427, 421) with which the necessary spacing of the output waveguides (421, 422) is established.

Figure 5:
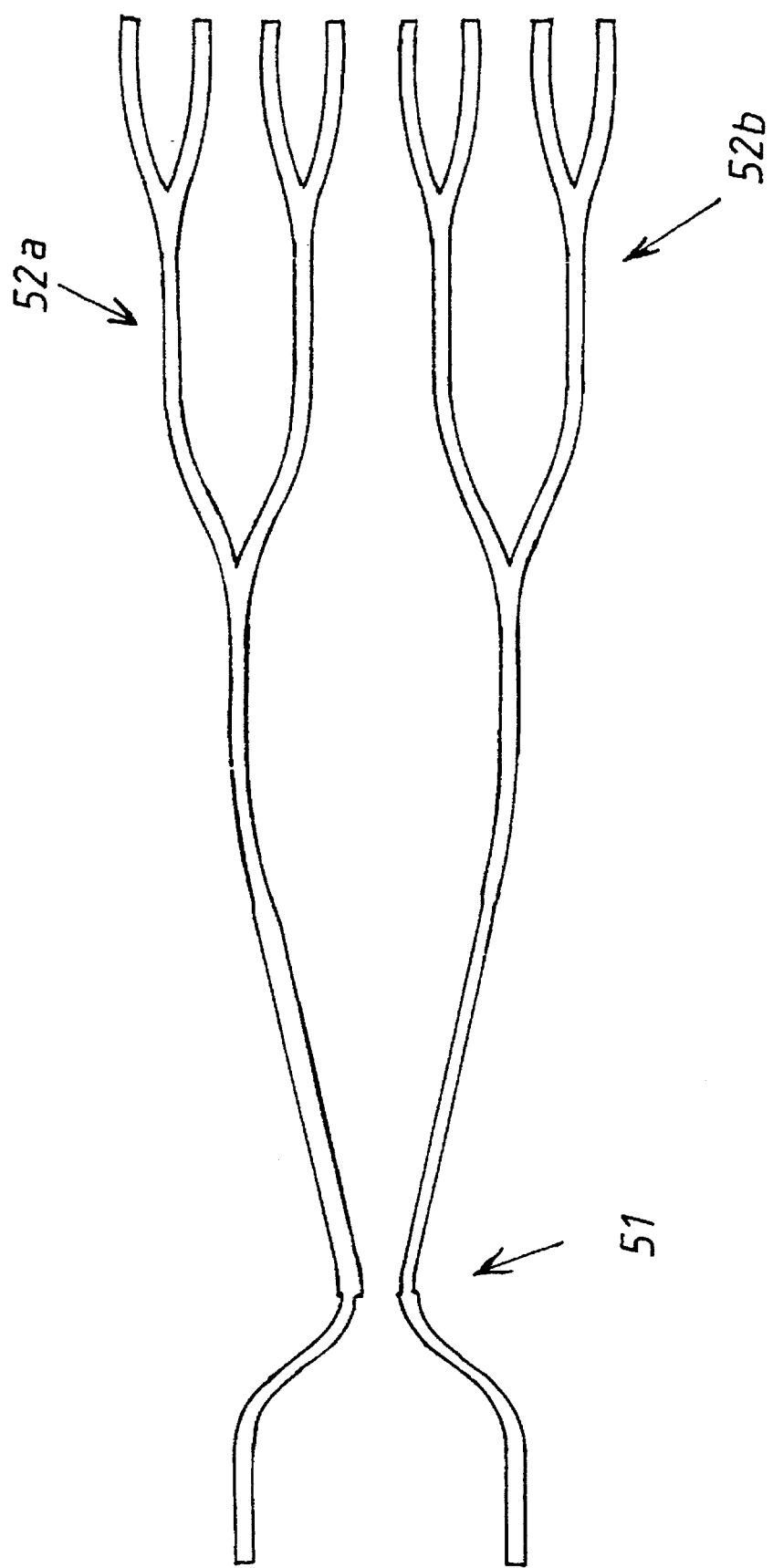

FIG. 5 shows the 2×2 coupler 51 of the invention as a component part of a 2×N branching device wherein N=8 for a specific case. Such a structure is provided when a 1×N/2 branching device (52a, 52b) is connected to each of the two outputs. The 2×2 coupler is shown only schematically in FIG. 5.

Such structures are important components of networks utilized in communications technology. There, these structures can replace the conventional 1×N branching devices. The second input can serve as a substitute for a possibly defective first input or as input for reference signals for detecting faults or as a possibility of expanding the existing network to other wavelengths.

It is understood that the foregoing description is that of the preferred embodiments of the invention and that various changes and modifications may be made thereto without departing from the spirit and scope of the invention as defined in the appended claims.

What is claimed is:

1. An integrated (2×2) optical coupler comprising:

a carrier;

first and second input waveguides having different propagation constants and being mounted in said carrier;

said first and second input waveguides having respective straight, kink-free segments which approach each other adiabatically;

an interaction region for receiving said straight, kink-free segments;

first and second output waveguides having like propagation constants and extending from corresponding ones of said segments in said region without said input waveguides coming into contact with each other; and, said first and second output waveguides having arcuate segments arranged in said carrier so as to separate said output waveguides from each other with increasing distance away from said interaction region.

2. The integrated (2×2) optical coupler of claim 1, wherein light propagation takes place selectively from said output waveguides to said input waveguides and vice versa.

3. The integrated (2×2) optical coupler of claim 1, wherein said waveguides have respective widths and wherein said propagation constants are determined by said widths, respectively.

4. The integrated (2×2) optical coupler of claim 1, said input waveguides being mutually adjacent and having respective widths and said widths conjointly defining a mean value; each of said waveguides having a center and said first and second input waveguides being mounted in said carrier so as to have a center-to-center spacing greater than said mean value.

5. The integrated (2×2) optical coupler of claim 1, said spacing being greater than said mean value by at least 0.5 μm.

6. The integrated (2×2) optical coupler of claim 1, said first input waveguide and said first output waveguide being joined on center with an abrupt step; and, said second input waveguide and said second output waveguide being likewise joined on center with an abrupt step.

7. The integrated (2×2) optical coupler of claim 6, said carrier being a glass substrate and said waveguides being produced in said glass substrate by means of photolithographic and ion exchange process; and, said abrupt step being stepwise to the extent permitted by the resolution of said process.

8. The integrated (2×2) optical coupler of claim 1, said input waveguides including: respective first segments which are parallel to each other and said first segments each having the same propagation constant; respective circular arc second segments extending from respective ones of said first segments; and, said second segments extending into said kink-free segments, respectively; each of said waveguides having a taper between said second segment and said kink-free segment; and, said tapers causing said different propagation constants.

9. The integrated (2×2) optical coupler of claim 8, said straight, kink-free segments being arranged in said carrier so as to approach each other adiabatically at an angle (2Φ) conjointly defined thereby and said angle (2Φ) being less than 1°.

10. The integrated (2×2) optical coupler of claim 9, said angle (2Φ) being less than 0.2°.

11. The integrated (2×2) optical coupler of claim 1, wherein said coupler has an optical bandwidth greater than 200 mm.

12. An integrated optical multi-coupler comprising: a plurality of integrated (2×2) optical couplers and each one of said couplers including: a carrier; first and second input waveguides having different propagation constants and being mounted in said carrier; said first and second input waveguides having respective straight, kink-free segments which approach each other adiabatically; an interaction region for receiving said straight, kink-free segments; first and second output waveguides having like propagation constants and extending from corresponding ones of said segments in said region without said input waveguides coming into contact with each other; said first and second output waveguides having arcuate segments arranged in said carrier so as to separate said output waveguides from each other with increasing distance away from said interaction region; and, one of said couplers being a first coupler and an input waveguide of a second one of said couplers being connected to the first output waveguide of said first coupler and the input waveguide of a third one of said couplers being connected to the second output waveguide of said first coupler.

13. An integrated (2×N) optical coupler assembly comprising:

an integrated (2×2) optical coupler including: a carrier; first and second input waveguides having different propagation constants and being mounted in said carrier; said first and second input waveguides having respective straight, kink-free segments which approach each other adiabatically; an interaction region for receiving said straight, kink-free segments; first and second output waveguides having like propagation constants and extending from corresponding ones of said segments in said region without said input waveguides coming into contact with each other; said first and second output waveguides having arcuate segments arranged in said carrier so as to separate said output waveguides from each other with increasing distance away from said interaction region; and, two 1×N branching devices being connected to corresponding ones of said output waveguides of said coupler.

14. An asymmetric Mach-Zehnder duplexer assembly comprising:

a Mach-Zehnder interferometer including an output coupler defined by an integrated (2×2) coupler including:

a carrier;

first and second input waveguides having different propagation constants and being mounted in said carrier;

said first and second input waveguides having respective straight, kink-free segments which approach each other adiabatically;

an interaction region for receiving said straight, kink-free segments;

first and second output waveguides having like propagation constants and extending from corresponding ones of said segments in said region without said input waveguides coming into contact with each other; and, said first and second output waveguides having arcuate segments arranged in said carrier so as to separate said output waveguides from each other with increasing distance away from said interaction region.

* * * * *